United States Patent [19]
Vogel et al.

[11] Patent Number: 5,383,045
[45] Date of Patent: * Jan. 17, 1995

[54] CODE WORD RECOGNITION UNIT AND USE THEREOF

[75] Inventors: Paul Vogel, Steffisburg; Thomas Martinson, Fribourg, both of Switzerland

[73] Assignee: Acsom Tech AG, Bern, Switzerland

[*] Notice: The portion of the term of this patent subsequent to Jun. 15, 2010 has been disclaimed.

[21] Appl. No.: 778,221

[22] PCT Filed: May 21, 1991

[86] PCT No.: PCT/CH91/00122
§ 371 Date: Dec. 10, 1991
§ 102(e) Date: Dec. 10, 1991

[87] PCT Pub. No.: WO91/18485
PCT Pub. Date: Nov. 28, 1991

[30] Foreign Application Priority Data
May 23, 1990 [CH] Switzerland ............ 01 769/90-0

[51] Int. Cl.$^6$ .................. H04B 10/14; H04J 14/08
[52] U.S. Cl. ..................... 359/158; 359/126; 359/139
[58] Field of Search .............. 359/117, 135, 139, 126, 359/158, 168, 173, 177; 375/107, 113; 370/100.1

[56] References Cited
U.S. PATENT DOCUMENTS
5,220,448  6/1993  Vogel .................. 359/158

Primary Examiner—Leslie Pascal
Attorney, Agent, or Firm—McAulay Fisher Nissen Goldberg & Kiel

[57] ABSTRACT

The code word recognition unit (51) comprises an optical switching element which can be controlled electrically and serves as a light switch, a sequence generator (75) for electrically controlling the switching element (57), an optoelectrical transducer (60), an electrical integrator (63), a threshold circuit (66) and a control unit (69). In addition, there is a clock generator (72) and a decision unit (73).

Code words appear periodically at the input (53) as optical bit patterns (OM) which are synchronized with an assigned electrical comparison pattern (VM) at the control input (44). The light let through by the switching element (57) forms a voltage pulse (U) via the transducer (60) at the integrator (63), the level of the voltage pulse (U) forming a measurement for the agreement of the two patterns (OM, VM). If the two patterns agree, there is a clear maximum.

The code word recognition unit (51) serves for the rapid recognition of address codes on optical lines. Hadamard C codes preferably serve as address codes or as bit patterns (OM, VM). (FIG. 4).

5 Claims, 5 Drawing Sheets

```
11111111
10110100
10011010
10001101
11000110
10100011
11010001
11101000
```

```
00000000
01001011
01100101
01110010
00111001
01011100
00101110
00010111
```

CODE WORD RECOGNITION UNIT AND USE THEREOF

BACKGROUND OF THE INVENTION

1. Field of the Invention

The invention is directed to a code word recognition unit for an access node of optical transmission equipment. It is further directed to the application of such equipment.

2. Description of the Prior Art

Transmission equipment and diverse types of information transmission via transmission lines are known in general. Recently, optical transmission lines have become increasingly important for various reasons. In addition to the optical point-to-point connections, complicated network structures with optical lines are also known. For example, in an article entitled "Optical fibres in local area networks", Communications/Communications International, October 1985, pages 19 ff., B. Viklund describes various network structures with glass fiber cables for distribution networks and for networks with connections between diverse subscribers which can be set up individually. In the latter, a ring structure is most favorable. The subscriber stations of an optical transmission line of the aforementioned type are connected to the respective utilized fibers via optoelectrical couplers.

At present, there are components for optical systems, e.g. couplers, switches and modulators, based e.g. on InP semiconductor material, which utilize electro-optical effects in order to influence light. These elements work up to frequencies in the gigahertz range.

The use of address-coded packets for the transmission of information is generally known. Such packets comprise a header and an information part [hereinafter infopart], wherein the header contains all necessary data for the respective packet and the participating devices, e.g. a destination or target address, data concerning the type of packet, monitoring bits, etc. The infopart is available for the useful information to be transmitted.

When receiving information arriving via an optical line, it is unavoidable that at least a part of the light stream carrying the information is used. Further, every receiving subscriber station must be synchronized to the bit clock and to the clock of the passing packet.

SUMMARY OF THE INVENTION

The object of the invention consists in providing transmission equipment which makes do to a great extent without electrical regenerators while utilizing the aforementioned components. In particular, an address recognition unit is to be provided which is simple with respect to construction and operates in an uncomplicated manner.

The solution, according to the invention, makes it possible to provide flexible transmission equipment which has considerable advantages over the comparable, previously known equipment because of its more extensive optical construction. An outstanding immunity to electromagnetic interference, which in turn has a positive influence on the operating speed and sensitivity, should be noted in particular. The address recognition unit works with an integrator which is slow compared to the bit clock of the addresses and the transmission line and by nature has no problematical reactions to distortions and the like. The address recognition unit is accordingly suitable for rapid transmission lines up to clock frequencies of e.g. several gigabits. If the addresses are selected in a suitable manner, they can be easily distinguished from one another.

The invention is described in more detail in the following by way of example with reference to eight diagrams.

DESCRIPTION OF THE PREFERRED EMBODIMENTS

Figure 1:
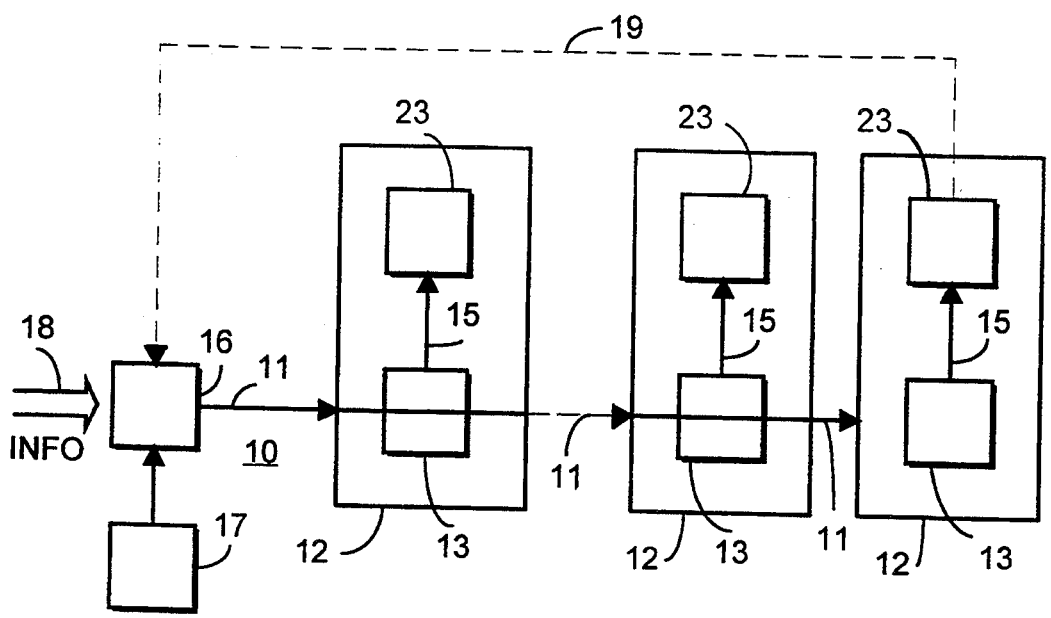
FIG. 1 is a schematic view of optical transmission equipment.

FIG. 1 shows a schematic view of transmission equipment 10 on which information is transmitted in the direction of the arrow in the form of addressed packets. An optical fiber 11, particularly a monomode fiber, serves as transmission medium. A plurality of access nodes 12 are incorporated in series in this fiber 11, so that the fiber 11 is divided into portions, but the light stream, as a whole, is not interrupted. In general, an address is assigned to each access node 12 by which it is distinguished from all other nodes. However, it is also possible for the same address to be assigned to a plurality of nodes 12.

The light stream commences in a transmitter 16, particularly a semiconductor laser, which feeds a substantially continuous constant light stream into the entry portion of the fiber 11, and an associated modulator for modulating this constant light stream. The modulated light stream passes through the fiber 11 and, in so doing, passes continuously through all access nodes 12. These nodes comprise access units 13 which do not interrupt the light stream, as has been described. By means of these access units 13, every node 12 is capable of reading the information contained in the light stream. At times, this information can be useful information contained in the packets. At other times, this information can consist of addresses, data concerning the packets, synchronization signals, etc. The information receivers 23, which are connected via connections 15 with the access units 13, serve to receive and evaluate the information.

It is advantageous if the modulation of the light stream is selected in such a way that existing light or high light power or high light intensity or brightness, respectively, represents the logical 1 state and nonexisting light or low light power or low light intensity or darkness represents the logical 0 state.

The bit clock of the light stream and the packets originate in the transmitter 16 in that its modulator is controlled by means of a clock generation unit 17 and as a function of the information to be transmitted, which is indicated as a bar arrow 18. Instead of packets, the light stream can also be organized by frames.

The optical fiber 11 can be arranged circularly and the receiver 23 of the last access node 12 can be connected with the transmitter 16 e.g. by means of a short electrical connection 19. Accordingly, a ring-shaped arrangement is formed in which the transmitter 16 contains the only light source. But the receiver 23 of the last access node 12 can also be electrically connected with the transmitter 16 of other transmission equipment 10, so that a doubling of the linear dimension is achieved. In such equipment, active transmitters 16 equipped with a light transmitter alternate with passive nodes 12 containing no light transmitter.

Figures 2, 6:
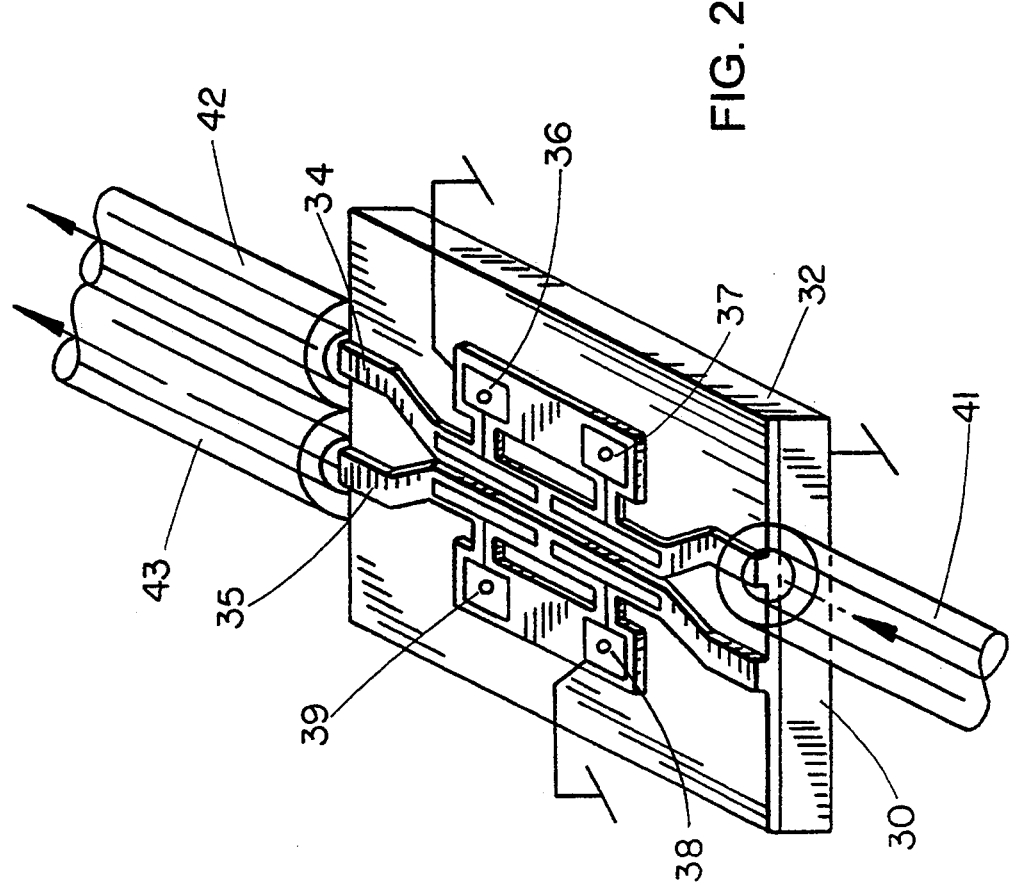
FIG. 2 is a schematic view of an optical directional coupler on a very enlarged scale.
FIG. 6 shows a set of sixteen code words.

FIG. 2 shows a schematic, greatly enlarged view of an integrated optical directional coupler 30 as the core of the aforementioned access units 13. The directional coupler 30 comprises two adjacent optical rib waveguides 34, 35 on a semiconductor substrate 32, e.g. an InP substrate, which rib waveguides 34, 35 are covered by a total of four metallic control electrodes 36 to 39, electrical control voltage can be applied via the latter. The directional coupler is connected on its input side to an incoming fiber, particularly a monomode fiber 41, by one rib waveguide 34. It is connected on its output side to an outgoing fiber 42 and 43, respectively, by both rib waveguides 34, 35.

Figure 3:
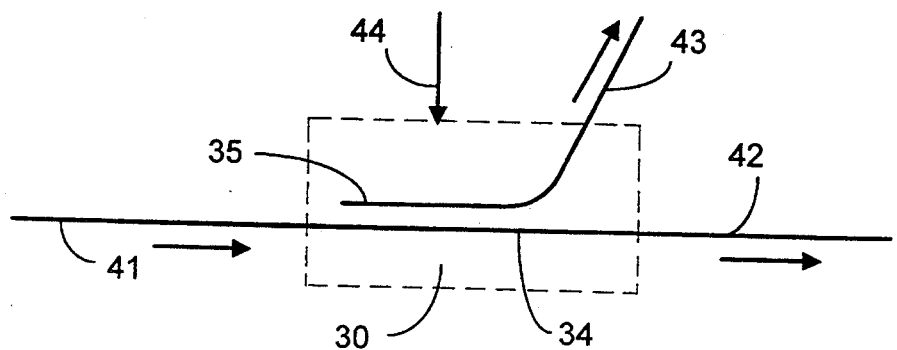
FIG. 3 is a symbolic depiction of the directional coupler.

The described example of the directional coupler 30 works as a light switch, wherein the light stream arriving via the fiber 41 can be divided in any desired ratio on the two outgoing fibers 42, 43 as a function of the voltages applied to the control electrodes 36 to 39. FIG. 3 is a symbolic representation of the directional coupler 30 for the purpose of expressing the switching function. The arrow 44 symbolizes the electrical control possibility which is provided by means of the control electrodes 36 to 39 (FIG. 2).

If the directional coupler 30 is completely switched through, then two "digital" switching positions result, namely one in which the light path from the input of the coupler to the respective output permits a light stream to pass and a second in which this path is blocked.

Figure 4:
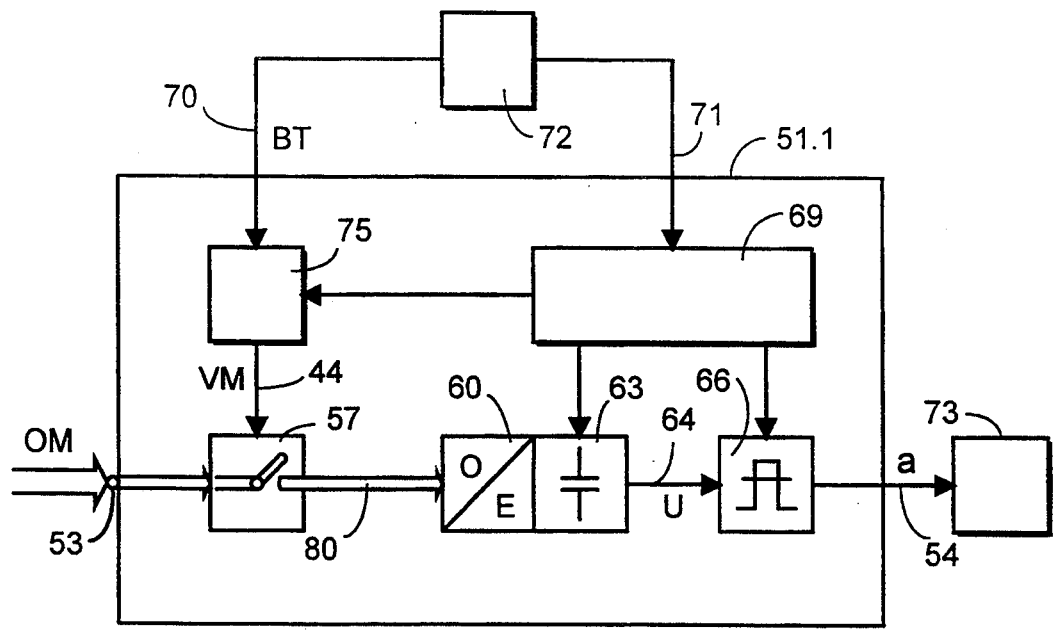
FIG. 4 is a block wiring diagram of a first code word recognition unit.

FIG. 4 shows a block wiring diagram of a code word recognition unit 51.1. This code word recognition unit 51.1 preferably serves to recognize the addresses of the passing packet in every access node. However, the unit 51.1 can be used in a very general way to recognize special codes, e.g. to recognize binary characters for distinguishing between different types of packets.

The code word recognition unit 51.1 comprises an optical input 53 which corresponds to the connection 15 in FIG. 1, and an electrical output 54. In the drawing the electrical connections are shown as simple arrows and the optical connections are shown as bar arrows.

The code word recognition unit 51.1 comprises an optical switching element 57 which can be controlled electrically, an optoelectrical transducer 60, an integrator 63, a threshold circuit 66, a control unit 69, and a sequence generator 75. In addition to this, there is a clock generator 72 and a decision unit 73.

The clock generator 72 is connected with the control unit 69 and the sequence generator 75. The latter (75) is connected with the switching element 57 and the control unit 69 is connected with the sequence generator 75, the integrator 63 and the threshold circuit 66. The output 54 connects the threshold circuit 66 with the decision unit 73.

The clock generator 72 generates a clock which is (theoretically) exactly identical to the bit and packet clock on the optical fiber 11 at the location of the respective access unit 13. This clock is fed to the sequence generator 75 via the connection 70. The control unit 69 receives a trigger signal via the connection 71 as soon as a code pattern to be recognized, e.g. a packet address, is expected at the input 53 of the code word recognition unit 51.1.

The sequence generator 75 transmits a serial, electrical comparison pattern VM to the switching element 57 in the bit clock BT of the clock generator 72 so as to be triggered by the control unit 69. This comparison pattern VM comprises a sequence of a plurality of bits, i.e. the values logical 0 and 1. It corresponds entirely to one of the various optical patterns OM transmitted by the transmitter 16 as addresses or other codes.

A directional coupler 30 of the type described in the preceding, for example, serves as optical switching element 57, wherein the latter either unblocks or blocks the optical path between the optical input 53 and its single output 80, as controlled by its control input 44. The switching element 57 accordingly works as an on/off switch.

Alternatively, the optical switching element 57 can be constructed as any desired element which fulfills the described functions. Such elements are e.g. controllable optical amplifiers, optical modulators, controlled mirrors etc.

The optoelectrical transducer 60 is preferably a rapid photodiode with a suitable amplifier connected subsequent to it. In this case, the output capacitance of the diode together with the input capacitance of the amplifier, which is coupled to the diode in a spatially close manner, form the integrator 63. The "virtual" magnitude of the integrator, its RC time and other parameters, can be influenced by the manner in which the circuitry of the amplifier is constructed. The integrator 63 transmits voltage pulses U at its output whose level forms a measurement for a respective integral.

The threshold circuit 66 is a unit which decides, in the manner of a monostable multivibrator, whether an occurring voltage pulse U is greater or smaller than a predetermined trigger voltage. The threshold circuit 66 transmits a signal a via the output 54 to the decision unit 73 which ensures a further processing of this signal.

The code word recognition unit 51.1 operates as follows: The control unit 69 releases the work on the basis of a clock signal on the connection 71. The optical pattern OM which is branched from the fiber 11 reaches the switching element 57 during the latter via the optical input 53. The sequence generator 75 transmits the electrical comparison pattern VM to the control input 44 of the switching element 57 simultaneously, i.e. so as to conform to the phase and clock. The switching element 57 switches the light or, more exactly, the brightness/darkness sequence of the optical bit pattern OM, through to the optoelectrical transducer 60 in a bit-by-bit manner and as a function of the logical importance of the respective bit of the comparison pattern VM or blocks the optical path.

The optoelectrical transducer 60 receives the light permitted to flow through by the switching element 57 and converts this light into an electrical charge e in proportion to its respective light power or light quantity. This charge e forms an electrical voltage pulse U in the integrator 63 which electrical voltage pulse U is totally dependent on the patterns OM and VM. The threshold circuit 66 compares the level of the voltage pulse U with its threshold voltage and transmits a signal a to the output 54, which signal a indicates whether the voltage pulse U is greater or smaller than the threshold voltage. The decision unit 73 evaluates this signal a, while the control unit 69 resets the integrator 63 to its initial state ("clear" function).

If the optical bit pattern OM and the electrical comparison pattern VM are identical and appear at the respective inputs of the switching element 57 at the identical phase and clock, i.e. if there is equality and exact synchronism, then a state known in a correlator as autocorrelation occurs in practice. This means that the voltage pulse U reaches an extreme value, either a maximum value Umax because all light is allowed through, or a minimum value Umin because all light is blocked, i.e. zero light quantity. The logical value, 1 or 0, assigned to the states, light or no light, at the input 53 of the switching element 57 determines which of these extreme values is reached. It is assumed in the following that the extreme value is a maximum value Umax.

The case of exact agreement between the optical pattern OM and the comparison pattern VM mentioned above occurs when the searched pattern, e.g. the individual address, appears at the input 53. In all other cases, i.e. with other addresses, the respective voltage pulse U is smaller. This will be explained in more detail in the following.

Figure 5:
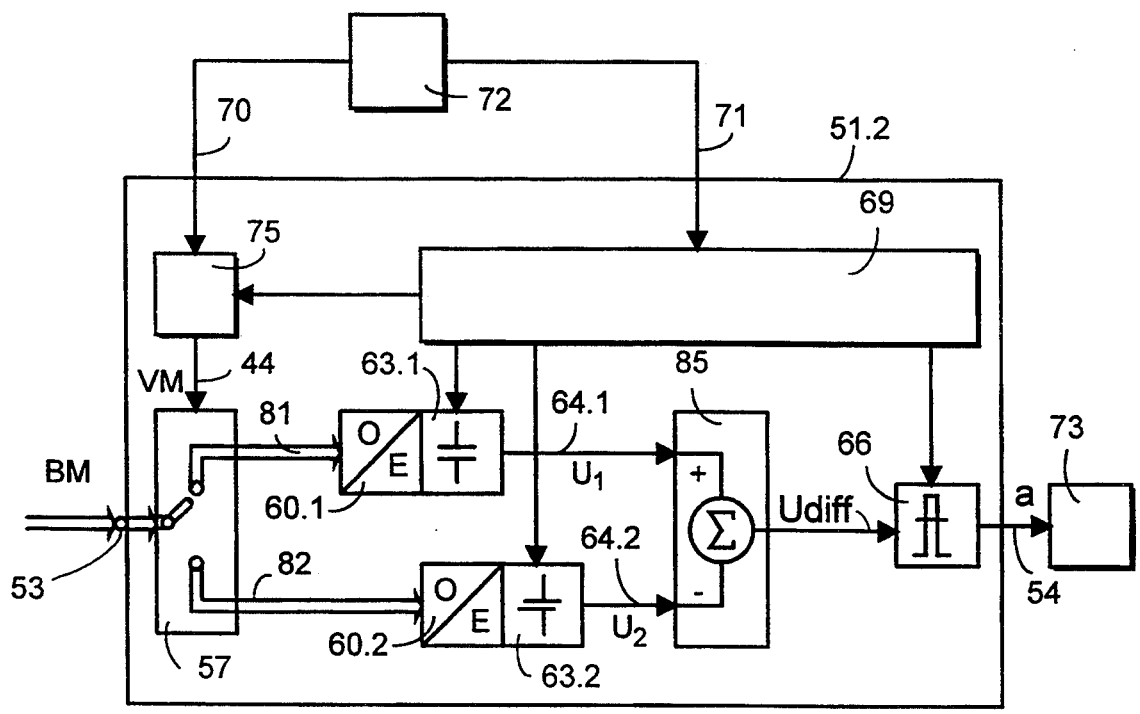
FIG. 5 is a block wiring diagram of a second code word recognition unit.

FIG. 5 shows the block wiring diagram for a second, somewhat modified code word recognition unit 51.2. In the latter, the switching element 57 forms an optical reverse switch whose input 53 and two outputs 81, 82 are optically connected with one another, as desired, by means of the control unit 69 and the sequence generator 75. Two identical optoelectrical transducers 60.1, 60.2 and associated integrators 63.1, 63.2 are connected subsequent to the outputs 81, 82. A subtraction stage 85 which forms the differential Udiff from the two voltage pulses U1, U2 at the outputs 64.1, 64.2 of the integrators 63.1, 63.2 is connected to the outputs 64.1, 64.2 of the integrators 63.1, 63.2. The differential voltage pulse Udiff which is thus formed is supplied to the threshold circuit 66.

In other respects, the code word recognition unit 51.2 is constructed in the same manner as the described code word detection unit 51.1 (FIG. 4) and works in a similar manner. The difference consists in that a sharper difference results between the different occurring addresses due to the controlled optical reverse switching to the two outputs 81, 82 and due to the differentiation in the subtraction stage 85. Further, there is an improved response during the occurrence of noise, which is always unavoidable, and during deviations from the exact phasing.

The type of code words and addresses to be used and distinguished will be discussed in more detail in the following. For various reasons, these code words must satisfy a great number of conditions, the most important of which are listed as follows:
- all of the code words (or addresses) to be compared must have the same length, i.e. they must possess the same number of bits.
- All code words must have the same number of bits of the value logical 1, that is the same "weight".
- The length of the code words may not be too great, but also not too short. If the code words are too short, the "interpretation dynamic" will be relatively small. This means that it will be relatively difficult to distinguish the various code words. Further, the set of different code words is quite small in this case, i.e. there are only a few code words belonging together. Excessively long code words on the other hand negatively influence the transmission capacity, i.e. they enlarge the "header" of the packet.
- The code words must be easy to generate. This requirement is important with high transmission bit rates, e.g. in the Gbit range.
- The code words must have a certain resistance to individual, small bit errors.
- There should preferably be a broadcasting code word which is readable by all access nodes 12.

FIG. 6 shows a first set of sixteen code words whose length is 8 bits; fourteen of these words have four bits of logical 1 and logical 0 in each instance. This set meets the listed conditions to a great extent and is known, per se, as (8, 16, 4) Hadamard C code. (F. J. Mac Williams and N. J. A. Sloane: The Theory of Error Correcting Codes, Amsterdam, North Holland, 1981).

There are Hadamard codes (presumably) for every length which is a multiple of 4. The code words of such a code are (N, 2N, N/2) words, wherein N is the length of a code word, 2N is the number of code words of the respective set, and N/2 is the minimum Hamming distance. In addition to this, there is an only-ones code word and an only-zeros code word. The two half sets of a respective code set form binary complements (0 and 1 are exchanged with one another).

The code words of FIG. 6, with the exception of the first bit in each instance, can be generated in a simple manner by means of cyclical exchange and possibly by additional inversion.

Figure 7:
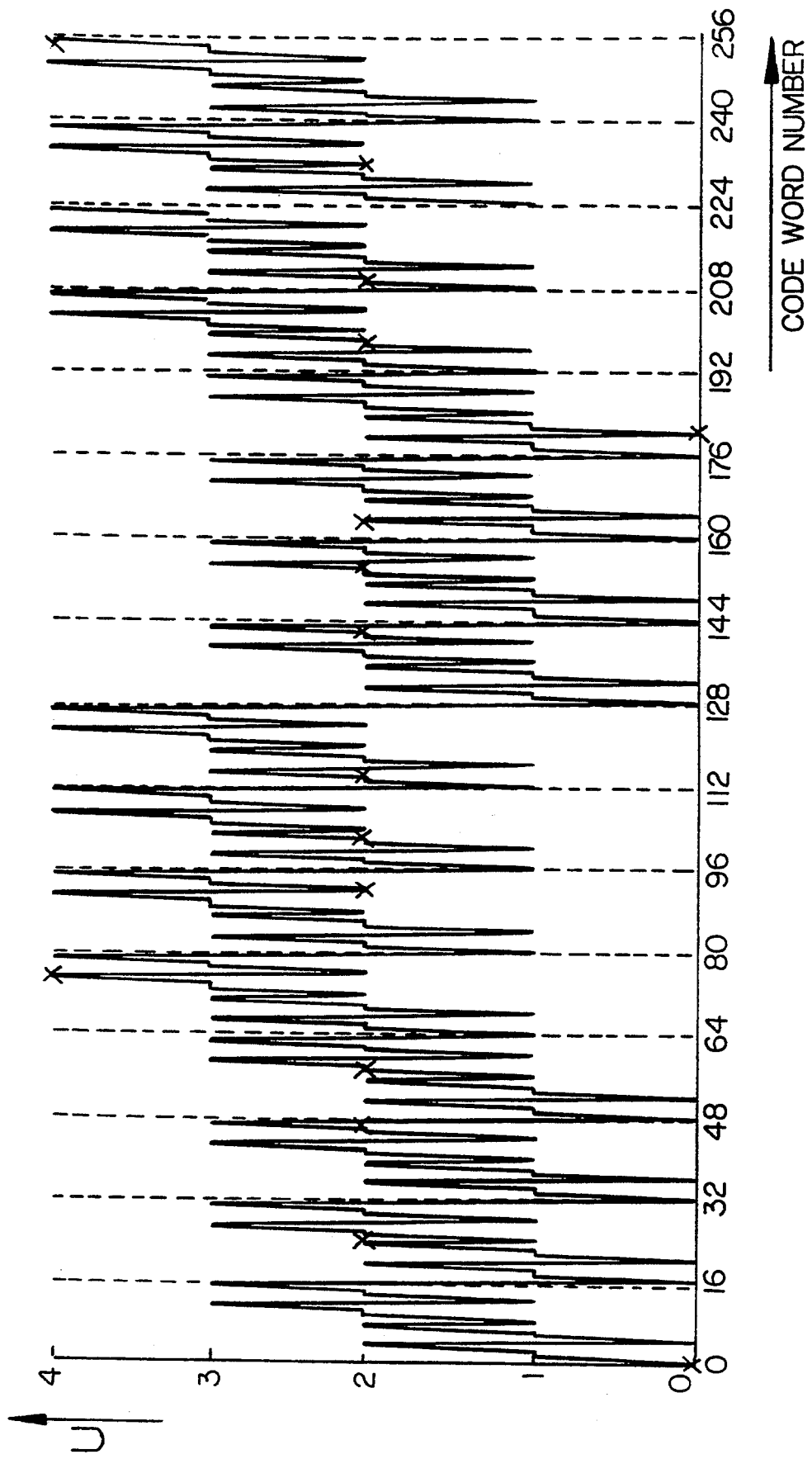
FIG. 7 shows first voltage pulses calculated for the set of FIG. 6.

FIG. 7 shows values of the voltage pulses U calculated for the first code word recognition unit 51.1. These pulses U are plotted in arbitrary units as ordinate, e.g. in mV. The code words to be compared are plotted next to one another on the abscissa. Every code word has a length of 8 bits and is designated by the decimal number assigned to the code word read as dual number. Accordingly, a total of 28 or 256 code words are plotted by a point in each instance, the points being connected by connecting lines for the sake of clarity. The points of those code words listed in FIG. 6 are further marked by crosses.

It is assumed for the calculation that the 75th code word is assigned as address of the first code word recognition unit 51.1. In this case, this code word is then transmitted to the switching element 57 as comparison pattern VM by means of the sequence generator 75. If the optical pattern OM also corresponds to the 75th code word, a voltage pulse of value 4 is formed at the integrator 63 (as is shown).

On the other hand, if another code word with 4 bits of logical 1 appears at the input 53 of the code word recognition unit 51.1, then voltage pulses U of value 2 result. If the zero (0th) or 255th code word appears, there is no voltage pulse (U=0), or there is a pulse of value 4.

With these values, the first code word recognition unit 51.1 has an interpretation dynamic ID of 2 value units for all code words with 4 bits of the value logical 1. (On the other hand, there is no possibility of distinguishing relative to the 255th code word.) The trigger voltage of the threshold circuit 66 should therefore be adjusted between the values 2 and 4 (depending on the noise level), that is, e.g. to value 3.

Figure 8:
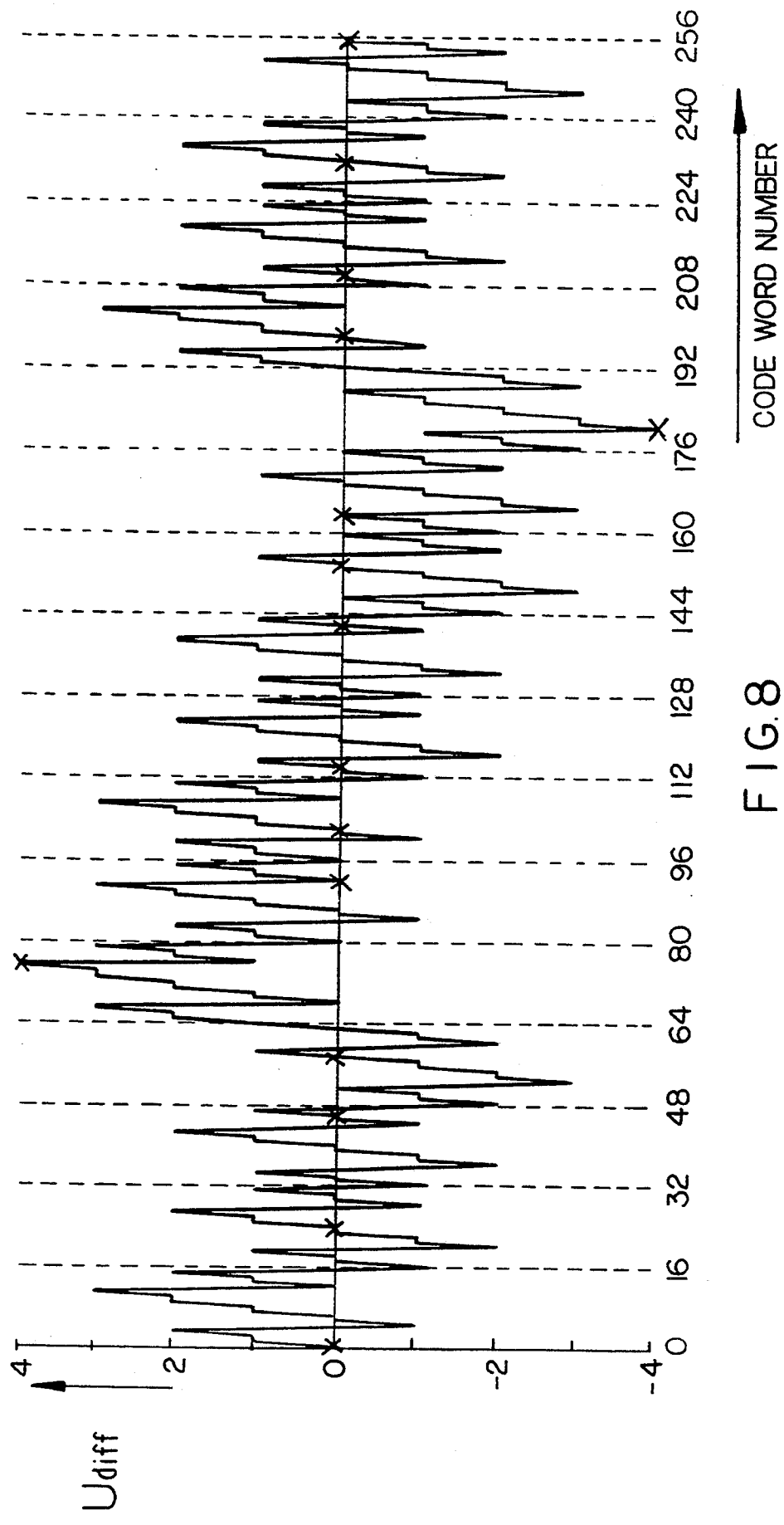
FIG. 8 shows second voltage pulses calculated for the set of FIG. 6.

FIG. 8 shows the values of the differential voltage pulses Udiff calculated for the second code word recognition unit 51.2. This diagram corresponds to that of FIG. 7. The pulse levels are plotted in arbitrary units on the ordinate, the 256 different code words with a length of 8 bits are plotted on the abscissa. The pulse level for the 75th code word, which is again selected as address of the (second) code word recognition unit 51.2, amounts to +4 in desired units. On the other hand, the pulse levels of all other code words of the code set of FIG. 6 is 0 to −4. Accordingly, the interpretation dynamic ID between the permissible code words contained in the code set is substantially better than that of the first code word recognition unit 51.1. Further, there is a clear difference relative to all impermissible code words. This results in a desired resistance to small code errors.

The 8 (calculated) values of FIGS. 7 and 8 apply for exact correctness of phase and exact synchronism, respectively, between the respective optical patterns OM and the comparison pattern VM. When there are phase deviations between the patterns, as occurs naturally in practice, the relationships worsen. However, it is known that phase deviations up to approximately 15% of the length of a bit are acceptable.

The code word recognition units 51.1 and 51.2 work with very low light powers. They are robust in relation to disturbances, phase deviations, bit errors, noise and the required quality of the light bits. Accordingly, they work substantially better than comparable units which operate in a purely electronic manner. This is based primarily on the balancing function of the integrators 63, 63.1, 63.2 which are based on analog technology and not on digital technology. Accordingly, there is a reduction of the required working speed by a substantial factor at a decisive place in the overall arrangement.

The code word recognition units 51.1, 51.2 accordingly allow a plurality of code patterns, particularly address patterns, to be recognized in a quick and certain manner. They can accordingly be used in access units 13 which check the addresses of passing packets in a "flying" manner, i.e. almost without a delay in time.

The invention allows a great number of variants:

Instead of the described Hadamard C code, other code sets can also be used. For example, codes which are formed by serial, doubled use of Hadamard C code words can be used. Such codes have a doubled sequence length and the same number of or considerably more different code words, depending on how the code word is specifically constructed.

The specific construction of the code word recognition units 51.1, 51.2 can be effected with commercially available optics and electronics modules or primarily as LSI modules. (LSI=large scale integration).

The sequence generator 75 can be constructed in such a way that it contains the respective comparison pattern VM in storage and transmits this comparison pattern VM so as to De controlled by means of the control unit 69 and in the clock of the clock generator 72. Instead of this, it can generate it again by means of a suitable algorithm or receive the comparison pattern VM from a unit, not shown, and transmit it to the optical switching element 57.

In its simplest construction, the threshold circuit 66 can be a monostable multivibrator. However, it can also form a more expensive circuit having a plurality of response thresholds. Accordingly, e.g. more exact data concerning the respective level of the voltage pulses U can be determined.

The subtraction stage 85 can be constructed either with analog technology, e.g. as a differential amplifier, or with digital technology, e.g. as a subtraction stage. It is further possible to connect the outputs of the two optoelectrical transducers 60.1, 60.2 of the second code word recognition unit 51.2 with one another electrically. In this case, a single integrator 63 results which is assigned to the common output formed in this way, the voltage pulses Udiff being formed directly at the latter. In this case, a separate subtraction stage 85 is unnecessary. If the optoelectrical transducers 60.1, 60.2 are photodiodes, these diodes can easily be connected electrically in series. In this case, the electrical connection between the diodes forms the aforementioned common output whose capacitance forms the common, individual integrator 63.

One or more code words are contained in every packet, preferably in its header. But they can also be distributed to several areas of the packet.

The access nodes 12 can be connected to a through-going fiber 11, as was described. However, it is also possible to use the code word recognition unit 51 in other nodes, e.g. those which electrically regenerate the light stream.

The integrator 63 can be designed differently using electronic means, particularly sensitive input amplifiers.

We claim:

1. A code word recognition unit for an access node of optical transmission equipment, wherein the transmission equipment comprises an optical transmission line on which an uninterrupted, directed bit stream flows in the form of a brightness/darkness sequence and with a given bit and frame clock, wherein signal information is regularly contained in the bit stream in the form of optical patterns, wherein the access node is equipped for receiving and reading these optical patterns, said code word recognition unit comprising: a switching element comprising an optical input, at least one optical output and an electrical control input whose optical input and outputs are connected by optics paths which can be switched so as to be electrically blocked or unblocked, and whose optical input is connected to the transmission line, a sequence generator which is connected to the control input of the switching element and transmits an electrical comparison pattern to the control input in phase with an optical pattern at the optical input of the switching element, optoelectrical transducers, each of which being individually connected subsequent to an optical output of the switching element and constructed for generating an electrical charge proportional to the received light quantity, electrical integrators which are connected subsequent to the transducers for the purpose of forming voltage pulses as a function of the charge occurring at the transducers, and a threshold circuit connected subsequent to the integrators for evaluating voltage pulses transmitted by the integrators and the threshold circuit.

2. The code word recognition unit according to claim 1, wherein the switching element is constructed as an optical on/off switch with a single output.

3. The code word recognition unit according to claim 1, wherein the switching element is constructed as an optical reverse switch with two outputs, wherein two optoelectrical transducers and two integrators are provided, and wherein a subtraction stage is provided, the subtraction stage being connected between the two integrators and the threshold circuit for forming a differential signal from the voltage pulses transmitted by the integrators.

4. The code word recognition unit according to claim 1, wherein the switching element is constructed as an optical reverse switch with two outputs, wherein two optoelectrical transducers and two integrators are provided, and wherein the transducers are electrically connected with one another in such a way that they have a common, single output to which a single integrator is assigned for forming a differential voltage signal.

5. The code word recognition unit according to claim 1, wherein the optoelectrical transducers are constructed as photodiodes with subsequently arranged amplifiers, and wherein the output capacitances of the photodiodes, together with the input capacitances of the assigned amplifiers, form the electronic integrators.

* * * * *